United States Patent
Martin et al.

(10) Patent No.: US 8,326,479 B2
(45) Date of Patent: Dec. 4, 2012

(54) METHOD FOR CONTROLLING A HEV FUEL PUMP

(76) Inventors: Douglas Raymond Martin, Canton, MI (US); Jesse D. L. Brunais, Livonia, MI (US); Kenneth L. Pifher, Holly, MI (US); Mike Paul Lindlbauer, Canton, MI (US)

( * ) Notice: Subject to any disclaimer, the term of this patent is extended or adjusted under 35 U.S.C. 154(b) by 0 days.

(21) Appl. No.: 13/336,665

(22) Filed: Dec. 23, 2011

(65) Prior Publication Data

US 2012/0136520 A1    May 31, 2012

(51) Int. Cl.
*B60W 20/00* (2006.01)

(52) U.S. Cl. ........ 701/22; 123/497; 123/332; 180/65.28

(58) Field of Classification Search ............ 701/22, 701/45; 290/40 A–40 C, 40 R, 36 R, 38 R, 290/25–28, 34, 35; 123/497, 446, 491, 333; 180/65.28, 65.265; 903/930, 903
See application file for complete search history.

(56) References Cited

U.S. PATENT DOCUMENTS

| | | | |
|---|---|---|---|
| 5,797,372 A * | 8/1998 | Sugimoto | 123/491 |
| 6,640,174 B2 * | 10/2003 | Schondorf et al. | 701/45 |
| 6,647,326 B2 | 11/2003 | Nakamori et al. | |
| 7,680,568 B2 | 3/2010 | Moran | |
| 2002/0020397 A1 * | 2/2002 | Begley et al. | 123/497 |
| 2002/0103590 A1 * | 8/2002 | Schondorf et al. | 701/45 |
| 2006/0190145 A1 * | 8/2006 | Yamamoto et al. | 701/22 |
| 2007/0240684 A1 | 10/2007 | Tippy et al. | |
| 2007/0289577 A1 * | 12/2007 | Yamaguchi et al. | 123/446 |
| 2008/0047524 A1 * | 2/2008 | Tamai et al. | 123/333 |
| 2009/0118878 A1 | 5/2009 | Park | |
| 2010/0140001 A1 | 6/2010 | Oe et al. | |
| 2011/0166727 A1 | 7/2011 | Light et al. | |
| 2011/0209691 A1 * | 9/2011 | Kuroki et al. | 123/568.21 |

OTHER PUBLICATIONS

Unknown, Diagnose Fuel Pump, AA1Car.com, http://www.aa1car.com/library/fuel_pump_diagnose.htm, Oct. 24, 2011.

* cited by examiner

*Primary Examiner* — Thomas Black
*Assistant Examiner* — Marthe Marc-Coleman
(74) *Attorney, Agent, or Firm* — David B. Kelley; Just Intellectuals, PLLC

(57) ABSTRACT

The present disclosure relates to a computer-implemented method of controlling an engine fuel pump in a hybrid-electric vehicle. The method includes: cycling a vehicle powertrain between an electric mode, where an engine is commanded off, and a mechanical mode, where the engine is commanded on; depowering an engine fuel pump when the engine is commanded off; and determining if the engine is operating in a fuel shut-off mode.

11 Claims, 3 Drawing Sheets

METHOD FOR CONTROLLING A HEV FUEL PUMP

TECHNICAL FIELD

The present disclosure relates to control strategies for hybrid electric vehicle fuel pumps.

BACKGROUND

Hybrid electric vehicles (or HEVs) utilize mechanical power from an internal combustion engine (or ICE) and electrical power from a battery pack. HEVs can alternatively rely on the ICE or battery pack for power; or the HEV can run off of a combination of the two. A generator is used to accumulate electrical power during ICE rotation. ICE utilization requires the use of several support systems that use electrical power including, for example, the fuel system. Powering the fuel system for any length of time when the engine is not being used by the powertrain consumes battery power unnecessarily.

Some conventional hybrid vehicles manage control of the fuel system according to the vehicle mode of operation. For example, U.S. Pat. No. 7,680,568 titled "Method of Controlling Engine Stop-Start Operation for Heavy-Duty Hybrid-Electric and Hybrid-Hydraulic Vehicles" discloses control of fuel injectors according to engine turn off or shutdown sequences. It is still desirable to have greater power conservation with respect to fuel pump utilization when the vehicle's powertrain is not relying on the ICE for power.

Other conventional systems turn off the fuel pump after the engine has completed a pull down cycle. However, even greater amounts of energy can be conserved prior to the end of an ICE pull down cycle.

Therefore, it is desirable to have a method for controlling a HEV fuel pump with improved efficiency.

SUMMARY

The present disclosure addresses one or more of the above-mentioned issues. Other features and/or advantages may become apparent from the description which follows.

One exemplary embodiment pertains to a computer-implemented method of controlling an engine fuel pump in a hybrid-electric vehicle. The method includes: cycling a vehicle powertrain between an electric mode, where an engine is commanded off, and a mechanical mode, where the engine is commanded on; depowering an engine fuel pump when the engine is commanded off; determining if the engine is operating in a fuel shut-off mode; when the vehicle is operating in a fuel shut-off mode, determining if the fuel shut-off mode is a deceleration fuel shut-off mode; when the fuel shut-off mode is a deceleration fuel shut-off mode, determining if the fuel line pressure is above a predetermined threshold; and depowering the engine fuel pump if the fuel line pressure is above the predetermined threshold.

Another exemplary embodiment pertains to a control circuit for a hybrid electric vehicle fuel system, including: a fuel pump for an internal combustion engine; a controller configured to power and depower the fuel pump; a fuel injector linked to the controller; and a pressure sensor linked to the controller. The controller is configured to turn the fuel injector off when the ICE is operating in a deceleration fuel shut-off mode. The controller is configured to depowering the fuel pump when the ICE is commanded off. The controller is further configured to depower the fuel pump when a pressure in the fuel line is above a threshold value and the ICE is operating in a deceleration fuel shut-off mode.

Another exemplary embodiment pertains to an engine control unit for a hybrid electric vehicle, having: engine command logic configured to control an internal combustion engine; fuel pump command logic configured to control a fuel pump for the ICE; and fuel shut-off command logic configured to control a fuel injector for the ICE. The ECU is configured to turn the fuel injector off when the HEV is operating in a deceleration fuel shut-off mode. The fuel pump command logic is configured to turn the fuel pump off when engine command logic instructs the ICE to turn off. The fuel pump command logic is further configured to turn the fuel pump off when a fuel line pressure is above a threshold value and the fuel shut-off command logic turns the fuel injector off.

One advantage of the presently disclosed control method is that it increases fuel efficiency for a HEV fuel system.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same reference numbers are used in the figures for identical or essentially identical elements. The above features and advantages and other features and advantages of the present invention are readily apparent from the following detailed description for carrying out the invention when taken in connection with the accompanying drawings. In the figures:

Figure 1:
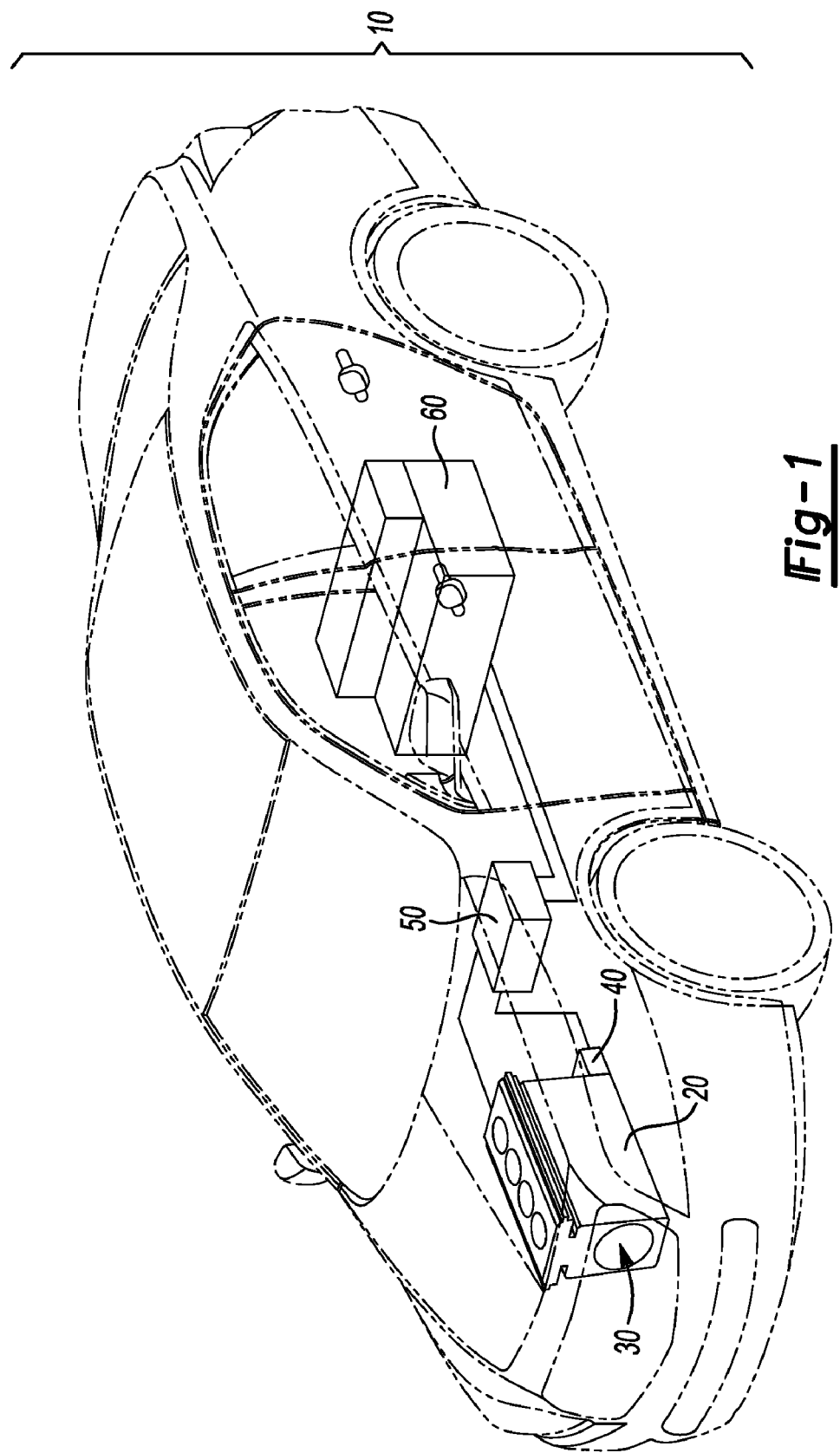
FIG. 1 is a perspective view of a HEV.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-4, wherein like characters represent the same or corresponding parts throughout the several views there are shown various embodiments of control systems for executing a method of controlling a HEV fuel pump that yields better fuel economy. The powertrain controllers are configured to shut an ICE fuel pump off automatically when the engine OFF command is issued by the engine control unit (or ECU), e.g., for an engine pull down. Therefore, greater electrical power is conserved. Some embodiments of the control strategy further include fuel pump shut-offs where vehicle abnormalities are detected (e.g., a battery power surge). In this way, fuel is not provided by the fuel pump when certain vehicle systems are performing in an unexpected manner.

Referring now to FIG. 1, there is shown therein a hybrid electric vehicle 10 in perspective with the powertrain exposed. Vehicle 10 includes an internal combustion engine (or ICE) 20 in the front section of the vehicle. In this embodiment, ICE 20 is an in-line four-cylinder engine. ICE 20 is connected to a transmission (not shown) through a flywheel 30. The engine 20 is fueled by a fuel pump 40 that retrieves fuel from a fuel tank or reservoir. The fuel pump 40 (as well as other engine support systems) is connected to a controller 50. The controller 50 is a powertrain control module (or PCM).

PCM 50, as shown in FIG. 1, is connected to the fuel pump 40. PCM 50 governs fuel pump performance. Within the PCM 50 is the engine control unit (or ECU) and the battery control module (or BCM). PCM 50 is also in communication with the ECU and BCM. When the ECU commands the engine on the PCM is notified. Once the engine is commanded off by the ECU the PCM is also notified and the PCM cuts off power to fuel pump 40.

Figure 3:
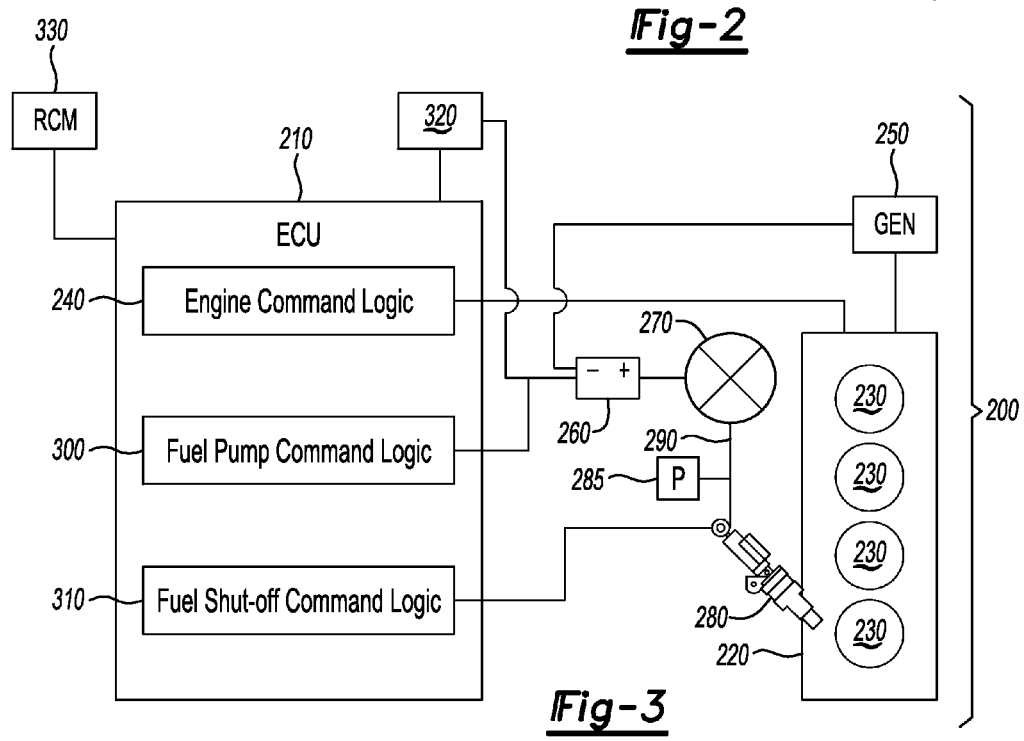
FIG. 3 is a schematic depiction of a control circuit for an HEV fuel system according to one exemplary embodiment of the present invention.

PCM 50 also governs operation of other powertrain support systems, such as fuel injectors (280 as discussed with respect to FIG. 3). PCM 50 is configured to turn the fuel injectors on or off, thereby overriding the operating cadence of the injectors under predetermined circumstances.

A battery pack 60 is also included in the vehicle powertrain, as shown in the rear section of the vehicle 10 of FIG. 1. Battery pack 60 includes a series of batteries arranged according to vehicle performance specifications. Different types of batteries can be used including, but not limited to NiMH, Li-ion and fuel cells.

Figure 2:
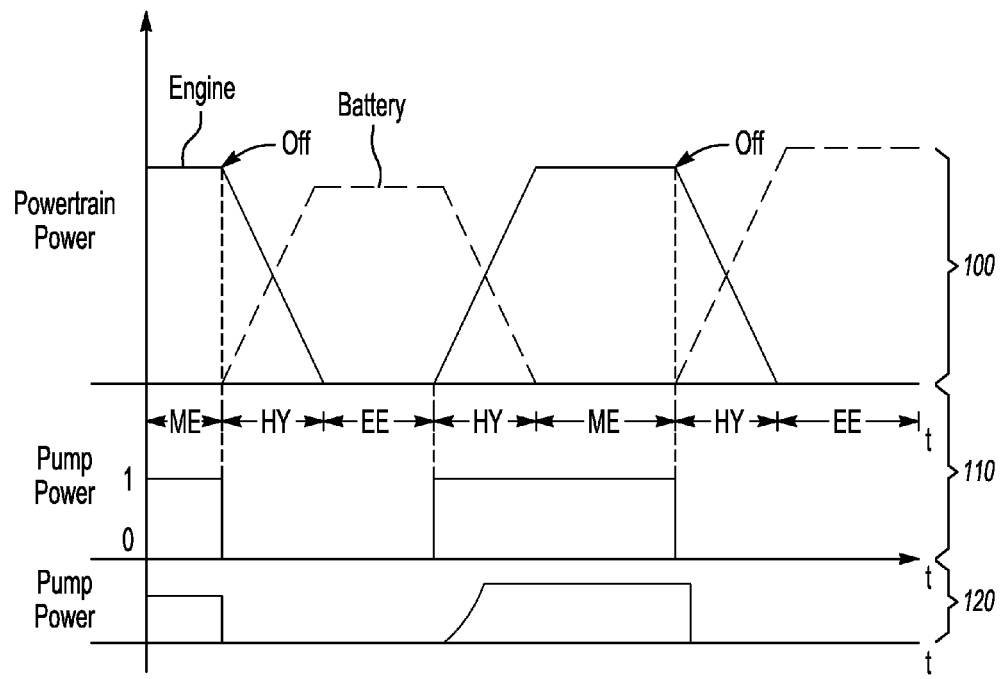
FIG. 2 is a graph of a HEV power cycle and fuel pump power cycle.

Referring now to FIG. 2, there is shown therein a HEV powertrain pattern 100 with respect to power utilization. The y-axis indicates the power used (labeled as "Powertrain Power"). Time, "t," is indicated on the x-axis. On the upper portion of the graph there is shown powertrain power over time. On the lower two portions of the graph there is shown fuel pump power over time for two control different methods, 110 and 120.

With reference to the upper portion of the graph in FIG. 2 or the powertrain pattern 100 the vehicle powertrain cycles between three different modes of operation. The first mode of operation is mechanical when the powertrain relies solely on engine power (labeled as "ME"). The engine power cycle is designated by the solid line labeled "Engine" shown in FIG. 2. When the powertrain relies on battery power, engine power trails off. At the beginning of the engine de-powering, the engine receives an engine OFF command as shown at the point labeled "Off" on FIG. 2. This portion of the powertrain power cycle is commonly referred to as an "engine pull down."

After the engine has received an OFF command the engine begins to reduce its speed, as shown in FIG. 2. As the engine is turned off the vehicle powertrain relies less on mechanical energy and more on electric energy supplied by the battery back (shown by the dotted line labeled "Battery"). This is a hybrid mode of operation for the vehicle powertrain, designated as "HY." The battery becomes the primary source of power for the vehicle powertrain. As shown in FIG. 2, the amount of electrical energy increases as needed by the vehicle until a threshold power rating is obtained. When the powertrain runs off of electrical energy this is an electric mode, labeled as "EE" on the graph of FIG. 2. When the powertrain switches back to engine power, the vehicle operates in a hybrid mode, using both mechanical and electrical power. The powertrain is also configured to operate in hybrid mode relying on both mechanical and electrical power to power the vehicle in a non-alternating fashion. This hybrid mode of operation is commonly referred to as a "powersplit." For the purposes of this disclosure the powertrain powersplit modes are expressed or figuratively represented in the hybrid modes on the graphs of FIG. 2.

In the succeeding mode, as shown in FIG. 2, the vehicle powertrain enters into another hybrid mode. The powertrain increases its dependency on mechanical power and decreases its dependency on electrical power. The powertrain repeats this cycling between mechanical modes and electrical modes according to performance demands and vehicle conditions.

As shown on graph 110 of FIG. 2, the fuel pump is controlled according to engine operation. When the engine is on the fuel pump is given power. The pump receiving power is designated by the numeral "1" on the y-power axis of the graph. When the engine is commanded off the fuel pump is also automatically turned off. Fuel pump having no power (or being depowered is designated as numeral zero "0" on the y-power axis of the graph). When the powertrain is operating in an electric mode (or hybrid mode when the engine is commanded off) the fuel pump is automatically turned off. The fuel pump is repowered when the engine ON command is received. Re-powering the pump when the engine is commanded on by the generator ensures that pressure in ready by the time fuel is requested, for example, at 300-400 RPMs.

In another embodiment, as shown in graph 120 of FIG. 2, the power provided to the fuel pump is proportional to engine demand. For example, at higher revolutions (e.g., 3000-4000 RPMs) the fuel pump is given more power than when the engine is operating at lower revolutions (e.g., 300-400 RPMs). For every 500 RPMs an additional kW is supplied to the fuel pump. In this way, fuel pump power is provided on-demand or as the engine requires it, even when the engine is still commanded on. By reducing pump capacity to the minimum required output during hybrid engine pull ups (i.e., engine re-starts after the electric mode) electric power usage is more efficient. The fuel pump is automatically depowered when the engine receives the power OFF command.

Now with reference to FIG. 3, there is shown therein a control circuit 200 for a vehicle powertrain. The control circuit 200 includes an engine control unit (ECU) 210. The engine control unit 210 is connected to an internal combustion engine (ICE) 220. As shown, internal combustion engine 220 includes four cylinders 230 that are controlled by the ECU 210. The ECU 210 includes engine command logic 240 as shown in FIG. 3. Engine command logic 240 is configured to command the engine on and off according to the powertrain power cycle. As previously discussed, if the powertrain is operating in an electric mode (or preparing to operate in electric mode) the engine will be commanded off by ECU 210.

ICE 220 is connected to a generator 250, as shown in FIG. 3. Generator 250 is dedicated to harvesting some of the rotational energy generated by the engine, particularly during engine down cycling. Generator 250 is connected to a battery pack 260 and supplements battery power. Fuel pump power is received from battery 260.

Fuel pump 270 is shown connected to an exemplary fuel injector 280 in FIG. 3. In this arrangement four (4) fuel injectors are configured to supply fuel to the ICE 220—one per cylinder. Fuel pump 270 provides fuel to the injectors which then deliver fuel to the cylinders 230 in accordance with engine program timing. A pressure sensor 285 is incorporated in the fuel line 290 between the fuel injector 280 and fuel pump 270. Sensor 285 indicates fuel line pressure. Fuel pump 270 is governed by fuel pump command logic 300. Fuel pump command logic 300 is also included in the ECU 210 in this arrangement. Fuel pump command logic 300 is configured to the power and depower the fuel pump 270.

In this embodiment, fuel pump command logic 300 is configured to turn the fuel pump 270 off whenever an engine OFF command is received from the ECU 210. Fuel pump command logic 300 is configured to automatically turn the fuel pump 270 on whenever an engine ON command is received from the engine command logic 240. Fuel pump 270 is de-powered automatically after the engine is commanded off, even though the engine continues to spin down.

ECU 210 as shown in FIG. 3 also includes fuel shut off command logic 310. Fuel shut off command logic 310 is configured to directly control the fuel injectors 280. Fuel shut off command logic 310 is configured to activate and deactivate the fuel injectors 280. In certain circumstances it is desirable to turn off the fuel injectors 280. For example, in a deceleration fuel shut off mode (or DFSO mode) fuel injectors 280 are turned off so that little to no engine power is used to propel the vehicle forward. Thus, the fuel system assists in vehicle deceleration. In this circumstance, fuel pump 270 can be powered but the fuel injectors ensure that the engine 220 does not receive fuel.

ECU 210, as shown in FIG. 3, is also in communication or linked to other vehicle control modules, e.g., the BCM 320 or the restraint control module 330. BCM 320 is configured to indicate when a power surge in the vehicle battery pack is detected. In this embodiment, fuel pump command logic 300 is configured to de-power the fuel pump 270 where the BCM 320 indicates that a power surge is detected. Restraint control module (or RCM) 330 is also linked to the ECU 210. RCM 330 receives vehicle condition information including vehicle stability data. RCM 330 is programmed with predetermined vehicle stability flags. Where RCM 330 detects a condition that triggers a vehicle stability flag, RCM sends a signal to ECU 210. Exemplary vehicle conditions that result in a vehicle stability flag include vehicle angular disposition, vehicle speed, unbuckled seatbelts, doors or trucks open, or airbags deactivated. Fuel pump command logic 300 is configured to depower the fuel pump under this circumstance as well.

The phrase "logic" can be used interchangeably with program, software, method or algorithm. Logics as discussed herein can be stored within a circuit or system having a processor with memory (e.g., any type of ROM or RAM). The logics can be programmed using any vehicle management software including, for example, C++.

Figure 4:
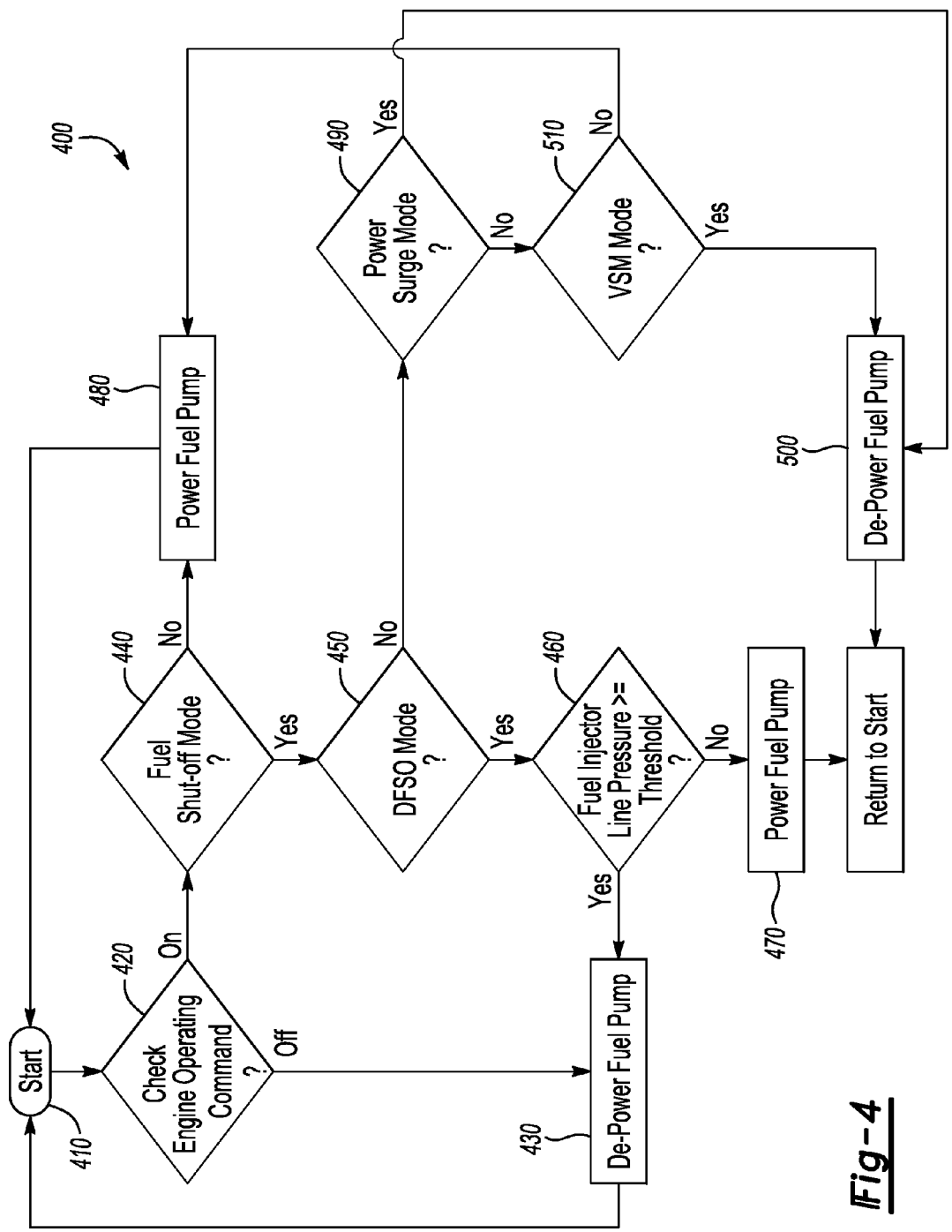
FIG. 4 is a flow chart of an exemplary method of controlling a HEV fuel system.

Referring now to FIG. 4, there is shown therein a control strategy or algorithm 400 for an engine control unit configured to control a fuel pump in a HEV. The control algorithm 400 is a method of controlling an engine fuel pump in a hybrid-electric vehicle. In one embodiment, method 400 includes cycling a vehicle powertrain between an electric mode, when an engine is commanded off, and a mechanical mode, when the engine is commanded on (e.g., as discussed with respect to FIG. 2); and depowering an engine fuel pump when the engine is commanded off. The strategies related to depowering the engine fuel pump are discussed in more detail below.

The control algorithm 400 can be executed by a system controller or microcontroller, e.g., the ECU 210 as discussed with respect to FIG. 3. At step 410, as shown in FIG. 4, the program starts. The program 400 checks to determine whether the engine has received an operating command at step 420. If the ECU has issued the OFF command to the engine the program turns off the fuel pump at step 430 and returns to start 410. In this way, program 400 is a closed-loop program.

If the engine has received an ON command the program proceeds to the next step 440 which inquires as to whether the engine is operating in a fuel shut-off mode, as shown in FIG. 4. If the engine is operating in a fuel shutoff mode fuel injectors will be deactivated. The program 400 determines whether the powertrain is operating in DFSO mode at step 450. When the engine is operating in DFSO mode the program continues to another decision step 460. Program 400 determines whether the fuel injection line (e.g., 290 as shown in FIG. 3) has sufficient pressure. Readings from a pressure sensor (e.g., 285 as discussed with respect to FIG. 3) are optionally used to determine if the pressure in the fuel line is at or above a predetermined threshold. If fuel line pressure in line 290 between fuel pump and fuel injectors is below the threshold, the program proceeds to step 470 and power is maintained in the fuel pump. The program 400 later re-checks fuel line pressure during a consecutive loop as the program returns to start 410.

If, however, the fuel line pressure is in excess of a predetermined threshold, program 400 continues to step 430. At step 430 the controller is programmed to depower the fuel pump. An exemplary pressure threshold for an in-line, 4 cylinder engine is approximately 10 psi. Once the program has turned off the fuel pump at step 430, the program continues to the start 410 of the algorithm 400.

In another embodiment, the control circuit does not include a pressure sensor. In this case step 460 is bypassed and the method automatically depowers the fuel pump at 430 when the powertrain is operating in DFSO mode. In another embodiment, the fuel line includes an electromechanical member (e.g., a solenoid valve or a transducer) that sends an override signal whenever the pressure in the fuel line is below a threshold value. In yet another embodiment, step 450 is eliminated and the control algorithm continues to power the fuel pump when the powertrain is operating in DFSO mode.

If the engine is not operating in the fuel shut-off mode, pump power is maintained at step 480 and the program returns to start 410. Referring now to step 450, where the program inquires as to whether the engine is operating in DFSO mode, when the answer to this inquiry is negative the program will proceed to step 490. Program determines whether the vehicle is operating in a power surge mode as shown at step 490. When an unwanted power surge is detected in the vehicle battery, fuel supply to the engine can be turned off. When the vehicle is operating in this mode the fuel pump is also de-powered at step 500. The program then returns to start 410. If the powertrain is not operating in the power surge mode, the program continues to step 510 to determine whether the powertrain is operating in a vehicle stability mode (or VSM). In this mode, various indicators of vehicle condition including, for example, vehicle position, speed, acceleration, yaw, pitch or roll are fed into the PCM. Where a predetermined vehicle condition is detected the powertrain can be operating in one of several vehicle stability modes that require cessation of fuel delivery. Under these circumstances, power is terminated at the fuel pump as shown in step 500. The program then proceeds back to the start at step 400. If the powertrain is not operating in VSM the program continues to power the fuel pump as shown at step 480.

Those familiar with the art to which this invention relates will recognize various alternative designs and embodiments for practicing the invention within the scope of the appended claims.

We claim:

1. A computer-implemented method of controlling an engine fuel pump in a hybrid-electric vehicle, comprising:
cycling a vehicle powertrain between an electric mode, wherein an engine is commanded off, and a mechanical mode, wherein the engine is commanded on;

depowering an engine fuel pump when the engine is commanded off;
determining if the engine is operating in a fuel shut-off mode;
wherein when the vehicle is operating in a fuel shut-off mode, determining if the fuel shut-off mode is a deceleration fuel shut-off mode;
wherein when the fuel shut-off mode is a deceleration fuel shut-off mode, determining if the fuel line pressure is above a predetermined threshold; and
depowering the engine fuel pump if the fuel line pressure is above the predetermined threshold.

2. The method of claim 1, further comprising:
repowering the fuel pump when the engine is commanded on.

3. A control circuit for a hybrid electric vehicle fuel system, comprising:
a fuel pump for an internal combustion engine (ICE);
a controller configured to power and depower the fuel pump;
a fuel injector linked to the controller; and
a pressure sensor linked to the controller;
wherein the controller is configured to turn the fuel injector off when the ICE is operating in a deceleration fuel shut-off mode;
wherein the controller is configured to depower the fuel pump when the ICE is commanded off;
wherein the controller is further configured to depower the fuel pump when a pressure in the fuel line is above a threshold value and the ICE is operating in a deceleration fuel shut-off mode.

4. The control circuit of claim 3, wherein the controller is configured to repower the fuel pump when the ICE is commanded on.

5. The control circuit of claim 3, wherein the controller is in communication with another vehicle controller.

6. The control circuit of claim 5, wherein the controller is in communication with a battery control module; and wherein the controller is further configured to depower the fuel pump when the ICE is operating in a power surge mode.

7. The control circuit of claim 5, wherein the controller is in communication with a restraint control module (RCM); and wherein the controller is further configured to depower the fuel pump when a vehicle stability flag is detected by the RCM.

8. An engine control unit (ECU) for a hybrid electric vehicle (HEV), comprising:
engine command logic configured to control an internal combustion engine (ICE);
fuel pump command logic configured to control a fuel pump for the ICE; and
fuel shut-off command logic configured to control a fuel injector for the ICE;
wherein the ECU is configured to turn the fuel injector off when the HEV is operating in a deceleration fuel shut-off mode;
wherein fuel pump command logic is configured to turn the fuel pump off when engine command logic instructs the ICE to turn off;
wherein the fuel pump command logic is further configured to turn the fuel pump off when a fuel line pressure is above a threshold value and the fuel shut-off command logic turns the fuel injector off.

9. The ECU of claim 8, wherein the fuel pump command logic is further configured to turn the fuel pump off when a power surge or vehicle stability flag is detected.

10. A computer-implemented method of controlling an engine fuel pump in a hybrid-electric vehicle, comprising:
cycling a vehicle engine on and off;
depowering an engine fuel pump when the engine is commanded off;
determining if the engine is operating in a fuel shut-off mode;
wherein when the vehicle is operating in a fuel shut-off mode determining if the fuel shut-off mode is a power surge mode; and
depowering the engine fuel pump if the fuel shut-off mode is the power surge mode.

11. A computer-implemented method of controlling an engine fuel pump in a hybrid-electric vehicle, comprising:
cycling a vehicle engine on and off;
depowering an engine fuel pump when the engine is commanded off;
determining if the engine is operating in a fuel shut-off mode;
wherein when the vehicle is operating in a fuel shut-off mode determining if the fuel shut-off mode is a vehicle stability management mode; and
depowering the engine fuel pump if the fuel shut-off mode is the vehicle stability management mode.

* * * * *